INVENTOR.
JOHN S. SUTTON
ATTORNEY

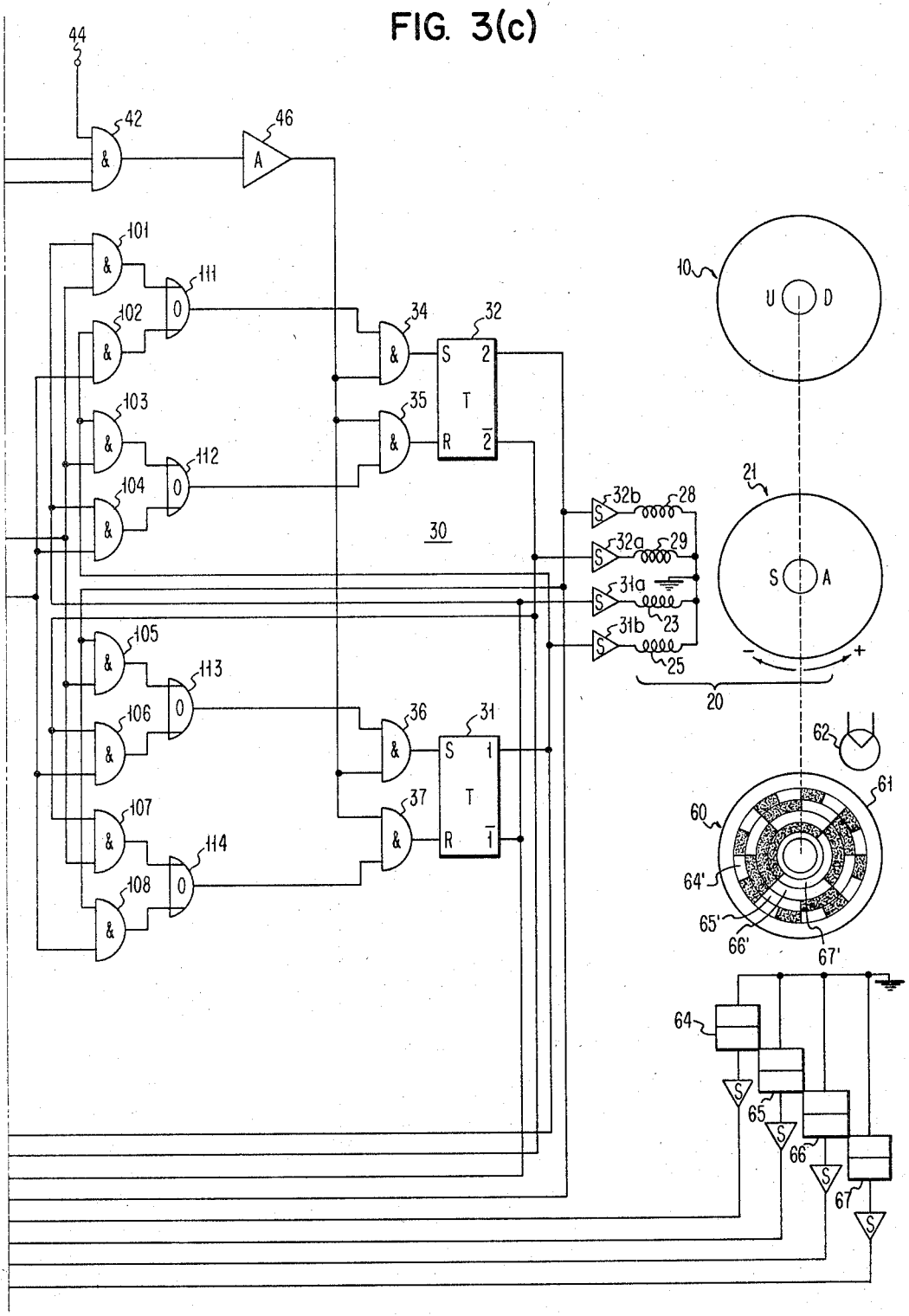

United States Patent Office 3,378,741
Patented Apr. 16, 1968

3,378,741
DIGITAL COARSE AND FINE STEPPING MOTOR
CONTROL USING AN ENCODER FOR COARSE
POSITION
John Stuart Sutton, San Jose, Calif., assignor to International Business Machines Corporation, New York, N.Y., a corporation of New York
Filed Sept. 18, 1964, Ser. No. 397,395
8 Claims. (Cl. 318—18)

ABSTRACT OF THE DISCLOSURE

A utilization device is positioned by a stepping motor or the like in response to the entry of a binary coded address in an address register. The instantaneous position of the device is obtained in binary coded form for comparison in a logic circuit arranged to gate pulses to the stepping motor at constant speed until the addresses are identical at which time the motor is stopped and detented. The coarse positioning of the motor and the device is obtained by a mechanical position encoder. The fine positioning of the device and the motor is obtained from the output terminals of bistable electric switching circuits which cyclically and selectively energize windings of the motor to step it in response to the pulses gated by the logic circuit.

---

The invention relates to control circuits for controlling the operation of electric motors, and it particularly pertains to controlling the incremental movement of stepping motors.

While the invention is described rather specifically in terms of rotational movement of electric stepping motors, it is to be clearly understood that the principles of the invention may be readily applied to a linear motor, or similar electric device, having a stator and an armature for positioning a movable member in a number of discrete positions.

The circuitry of the invention is applicable to effect incremental movement in either direction and to detent an electric motor of the synchronous inductor type having a permanently magnetized rotor and a plurality of circularly disposed stator poles magnetized upon energization of stator windings. The desired movement and detenting of the rotor of the motor is achieved by selective energization of the windings of the stator poles.

Electric motors of this general type are shown and described in U.S. Patent 2,931,929, issued on Apr. 5, 1960 to A. E. Snowden and Gustav O. Frederickson, and U.S. Patent 2,982,872, issued May 2, 1961 to Gustav O. Frederickson. These motors may be operated with the electric motor control circuit shown and described in U.S. Patent 3,117,268, issued Jan. 7, 1964 to Elmer W. Madsen.

With such motors and motor controlling circuitry, the movable member is positioned by counting pulses of a suitable pulse train applied at the input terminals of the circuitry with a counter of high precision and reliability. With other prior art controlling arrangements, the movable member is positioned with a servo system incorporating an encoder disk of high precision and tight tolerance. Both of these arrangements are quite expensive in the basic form, and exceedingly expensive when the reliability necessary for so many applications and purposes is included.

Accordingly, it is an object of the invention to provide an electric stepping motor control circuit of extremely high accuracy and reliability at low manufacturing cost.

In the practice of the invention, an arrangement for positioning a movable member, such as a rotatable shaft, in one of a number of discrete positions comprises a stepping device or motor having a stator and an armature, such as a rotor, coupled to the movable member or shaft for positioning the same in the same number of discrete positions and having a plurality of field windings selectively energizable for holding said armature and the movable member fixed in position and for stepping the armature and the movable member or shaft through a predetermined series of adjacent positions. Circuitry for cyclically energizing the windings and simultaneously generating a binary signal indicative of the fine positioning of the movable member or shaft within the series of adjacent positions is provided, preferably in the form of bistable electric switching devices. A position encoder for indicating the position of the movable member or shaft provides a binary coded signal indicative of the coarse positioning of the movable member or shaft to a particular one of a multiple of the series of positions determined by said bistable switching circuits.

Electric signals indicative of the desired position of said movable member or shaft are stored in an address register for comparison with the instantaneous actual position.

According to the invention these known components are interconnected in a novel manner wherein these address signals are compared by means of a signal comparing circuit with the coarse position signal from the position encoder and the fine position signal from the bistable electric switching circuit together representing the instantaneous position of the movable member. The signal comparing circuitry comprises electric switching means for applying pulses from a suitable source of electric pulses, stepping the device or motor until the position indicated by the quality of the signals at which position the device or motor is detented for holding the movable member or shaft in fixed relationship.

In order that full advantage of the invention may be obtained in practice, a preferred embodiment thereof, given by way of example only, is described in detail hereinafter with reference to the accompanying drawing, forming a part of the specification and in which.

Figure 1:
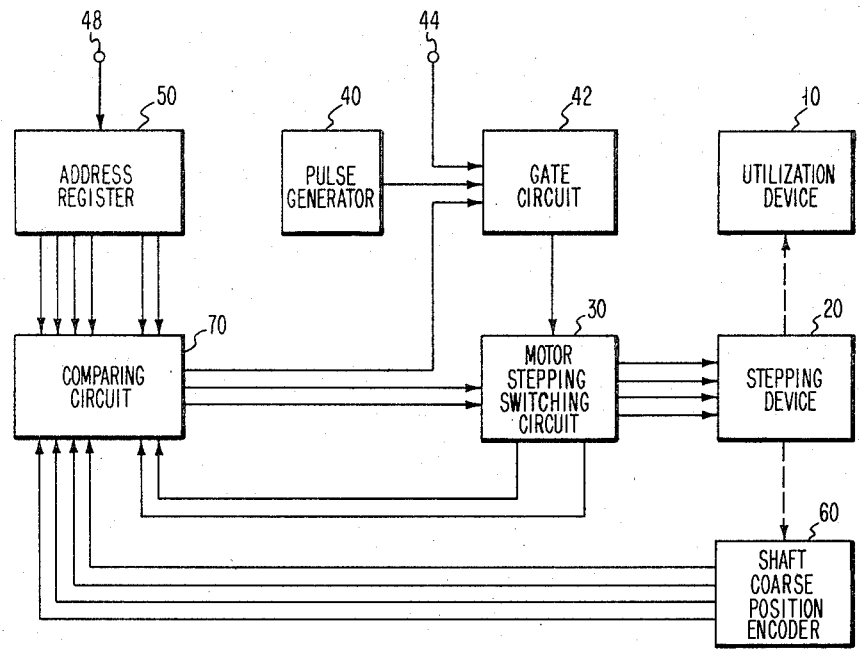
FIG. 1 is a functional diagram of an electric motor control circuit according to the invention.

FIG. 1 illustrates the fundamentals of the circuitry according to the invention. A utilization device 10 is positioned by means of a stepping motor device 20 in response to energization by a motor stepping switching circuit 30 to which electric pulses from a suitable source 40 are applied through a gating circuit 42. Preferably, enabling potential is applied at input terminals 44 of the gating circuit 42 for positive control of the displacement of the utilization device. Electric signals indicative of the position to which the utilization device is to be postioned are applied at input terminals 48 of an address register 50 for storage therein. The instantaneous position of the utilization device 10 is represented by electric signals generated by a shaft position encoder 60 indicating the course position and further electric signals taken from the motor stepping switching circuit 30 indicating the fine position of the stepping motor device 20 and the utilization device 10. These signals are applied to a comparing circuit 70 to which the electric signals stored in the address register 50 are also applied. The comparing circuit 70 has three output leads on which control potentials are developed for gating motor energizing pulses when the one lead conveys control potentials to the gate circuit 42 for controlling the supply of energizing pulses from the pulse generator 40 to the switching circuit 30. Address signals are not equal to the instantaneous shaft position signals. The other two leads alternately convey potentials for controlling the stepping of the motor device 20 in one direction or the other in accordance with the conditions set up in the switching circuit 30 and the comparing circuit 70.

It can be appreciated at this point that the shaft position encoder 60 required with the arrangement according to the invention does not require the tight manufacturing tolerance necessitated by the prior art position encoding arrangements because of the advantage taken in obtaining the fine position signals from the motor stepping switching circuit 30. Good tolerances are still required for the position coder sectors, but the tolerances need not be nearly as close as are required for high definition disks of the prior art arrangements and, therefore, not nearly as expensive. The accuracy and repeatability of the low order bits of the instantaneous position signal as taken from the connections between the motor stepping switching circuit 30 and the stepping motor device 20 according to the invention not only steps and detents the latter in simple fail-safe manner, but also eliminates the very expensive highly accurate and reliable electric pulse counting circuitry of other prior art arrangements.

Figure 2:
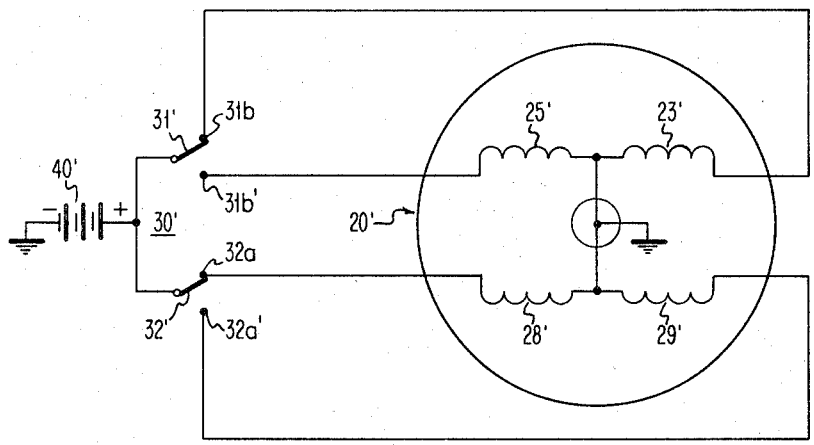
FIG. 2 is a schematic diagram of a motor for operation under the control of the electric motor control circuit of the invention.

FIG. 2 is a schematic diagram in basic form of a commercial embodiment of an electric motor useful in understanding the invention. The motor 20' is provided with four windings 23', 25', and 28', 29' which when energized in pairs detent the rotor until one winding at a time is de-energized and another energized to step the motor one increment and detent the same in the new position.

The motor depicted is of a synchronous permanent magnet type having a slow basic shaft speed of 72 revolutions per minute with 50 cycles per second alternating voltages applied. Although used extensively as a constant low speed A.C motor, its use as a D.C. stepping motor or incremental positioning device is widespread. The commercially available model used in reducing the invention to practice actually comprises an 8 pole stator with poles grooved to effect 48 teeth and a permanent magnet rotor having 50 teeth to form a 100 pole motor. It can be stepped through and stopped at 200 discrete positions for each revolution.

Two of the windings are energized at a time in sequential order; for example, 28' and 23'; 28' and 25'; 25' and 29'; 29 and 23'; 23' and 28', and repeating. Each change of energization of the terminals effects an increment of advance or a step of the motor in one direction. Reverse incremental rotation is obtained simply with the sequence of energization reversed. Thus, for reversed rotation the sequence of energization of the windings is 28' and 23'; 29' and 23'; 29' and 25'; 28' and 25'; 28' and 23', and so on. Moving the switches 31' and 32' one at a time will effectively apply current from a battery 40' to step the motor one increment for each throw of one switch and hold the motor 25' detented until the other switch is thrown.

FIG. 3 is a logic diagram of one circuit arrangement according to the invention for controlling a stepping motor. The arrangement depicted here follows simple, basic logic of conventional form which is readily understandable and readily applied in the practice of the invention. It should be clearly understood, however, that those skilled in the art may immediately adapt other logic more complex in nature to effect a reduction in size, or cost, or other reasons of technical importance best known to themselves.

Figure 3A:
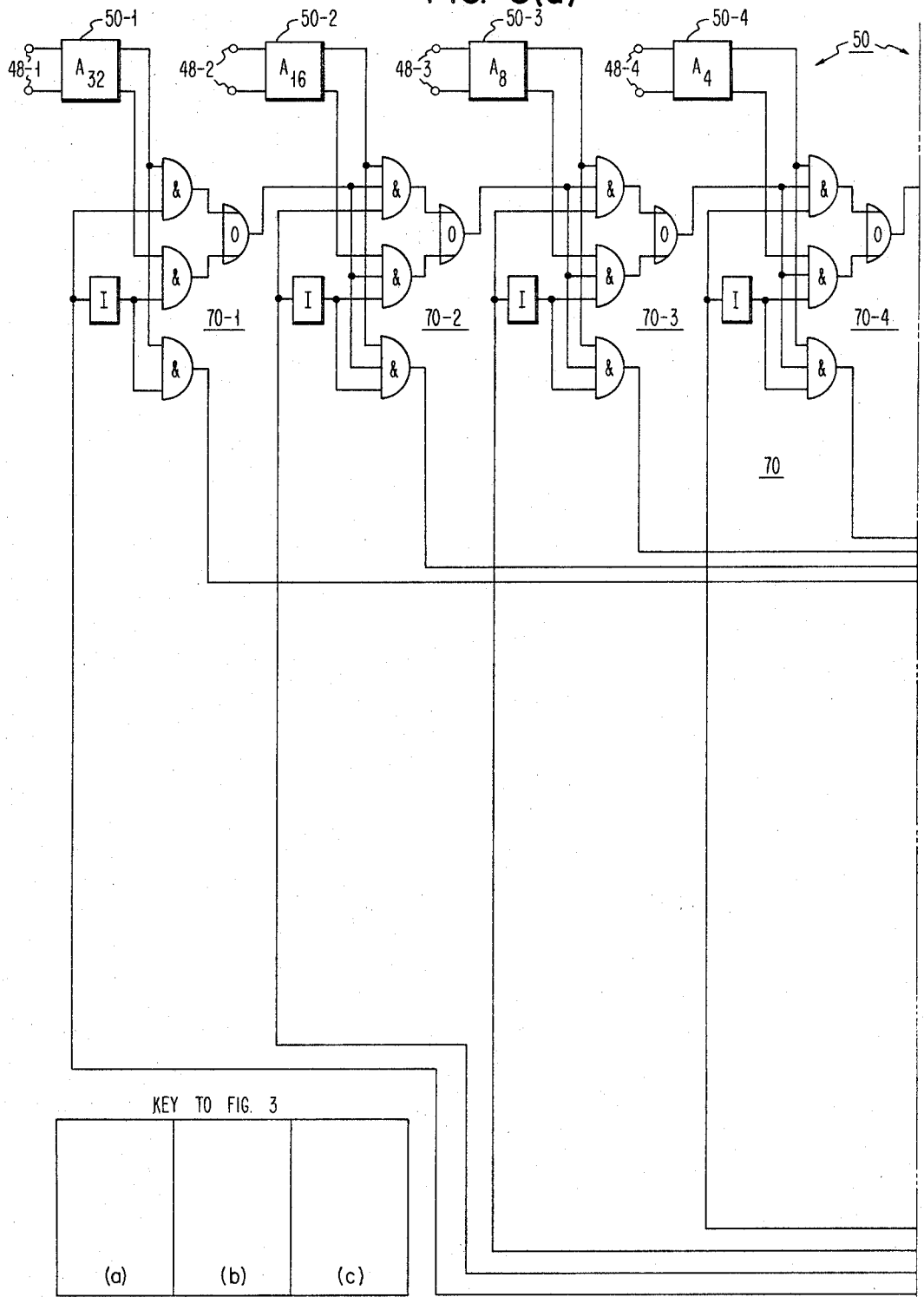
FIG. 3, sections (a), (b) and (c) being taken together, is a logic diagram of an electric motor control circuit according to the invention.
Figure 3B:
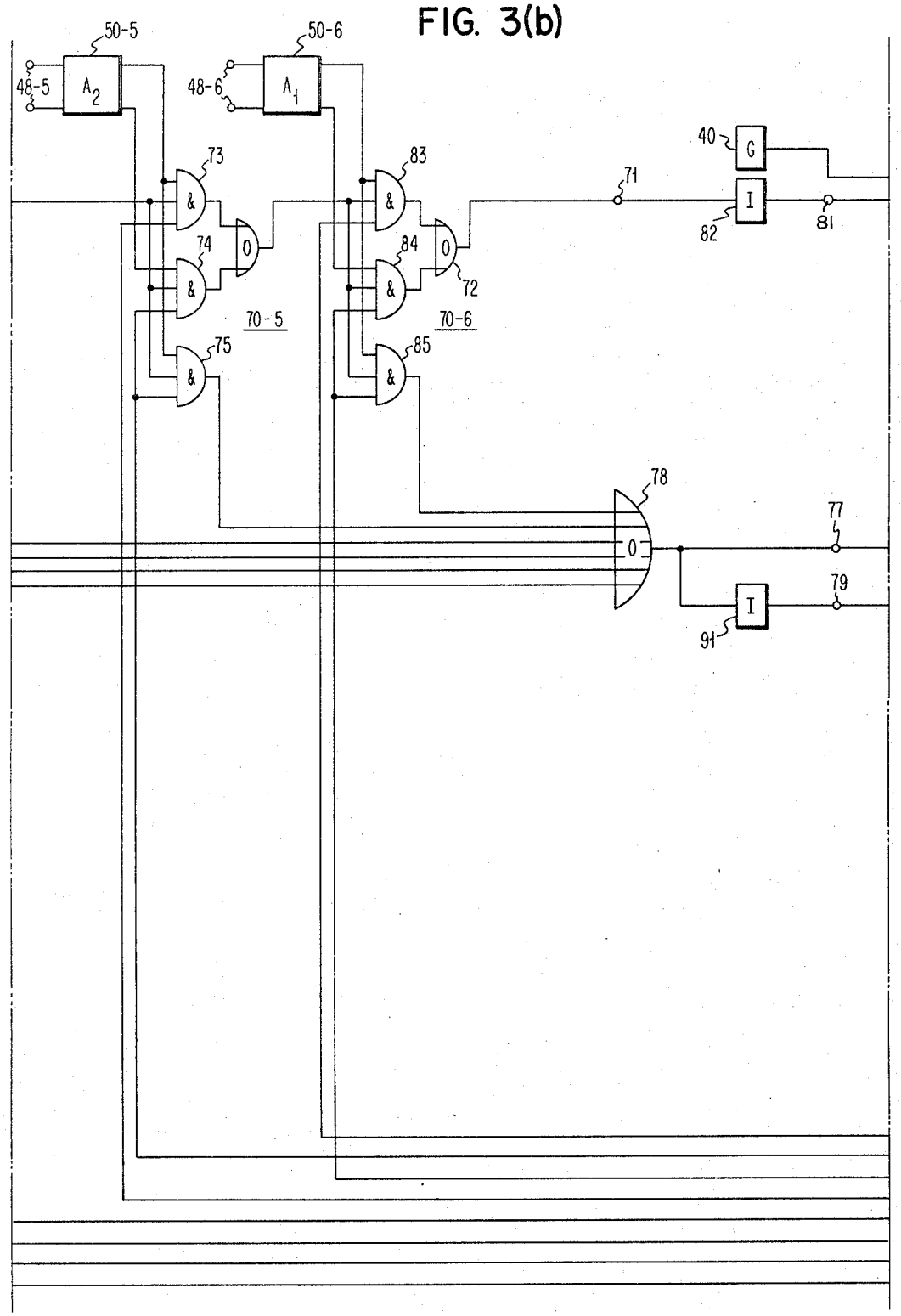

Referring particularly to FIGS. 3(a) and 3(b), there is shown an address register 50 comprising six flip-flop circuits 50–1 through 50–6 in which is stored in response to signals applied at the terminals 48–1 through 48–6, a binary representation of the address at which initially the utilization device is detented and subsequently the address of the position to which the utilization device is to be driven and thereafter again detented.

Referring to FIG. 3(c), the utilization device 10 is schematically shown, coupled mechanically to the schematically shown armature or rotor 21 of the stepping motor 20 which is driven to position the utilization device 10. The windings 23–29 of the motor 20 are energized by electric motor switching circuit 30 having a pair of bistable flip-flops or latching circuits 31 and 32 of conventional form delivering low output current to amplifiers 31a, 31b, 32a and 32b of conventional configuration supplying sufficient current to adequately energize the windings. In one sense the amplifiers 31a–32b can be considered switches since it is contemplated that in the preferred mode of operation of the circuit according to the invention, the two amplifiers alternate between saturation and cutoff in energizing the two windings selected. The latching circuits 31 and 32 are gated by AND circuits 34–37 through which energizing pulses are obtained from an amplifier 46 from a pulse generator source 40 and in response to an enabling level voltage applied at terminals 44.

The instantaneous coarse position of the utilization device 10, as well as that of the motor armature 21, is translated into a signal indicative of the instantaneous position by means of the coarse position encoder 60 comprising an encoder disk 61, for example of the optical type, having a lamp 62 directing light onto sectors of the disk 61 which are opaque and translucent according to binary code as shown. Those skilled in the art will readily adapt a cyclic code in the practice of the invention should they so desire, but in the interest of simplicity and directness in teaching the application of the invention a mask in binary code is shown. Light from the lamp 62 impinges on a plurality of photoconductors 64–67 selectively in accordance with the transmissivity of the encoding disk sectors 64'–67', respectively, generating a binary code signal indicative of the coarse position of the instantaneous position of the utilization device 10. That is, the four higher order digits of the position are so expressed, leaving two binary digits representing the one of four adjacent positions to be determined.

According to the invention the instantaneous fine position is indicated by the logical binary code conditions at the output terminals of the latching circuits 31 and 32 shown in FIG. 3(b). Current is always flowing at one of the terminals of each of the latches 31 and 32, serving to detent the rotor 21 in the desired position or to step it to that desired and thereafter detenting it. Thus, the instantaneous fine position is determined in simple manner with high accuracy.

Referring specifically to FIGS. 3(a) and 3(b), a conventional "high-low-equal" compare circuit 70 comprises stages 70–1 through 70–6. Each stage comprises three AND circuits and an OR circuit, while the higher order stages 70–1 to 70–4 also include an Inverter circuit. This comparator as shown is entirely conventional and well known to those skilled in the art.

Referring to the entire logic diagram comprising FIGS. 3(a), 3(b) and 3(c), the coarse position signal from the photoconductors 64–67 is applied to the higher order stages of the comparator 70–1 through 70–4 and the instantaneous fine position signals are applied to AND gates 73–75 of the penultimate stage 70–5 and to AND gates 83–85 of the final stage 70–6 of the comparator 70. The output terminal 71 of the final OR circuit 72 will be at the logical "1" level if all of the digits of the address compare equally and respectively to all of the digits of the coarse and fine position signals. The output terminal 81 of the inverter 82 will accordingly be at the logical "0" level at equality, thereby holding the motor circuit controlling gate 42 closed. When the comparator does not have an equality condition, the output 71 of the OR circuit 72 will be at logical "0" level, and the Inverter 82 will present an output of logical "1", which will enable the application of pulses from pulse generator 40 to the motor switching circuit 30. If desired, this application of pulses is restricted to the described gating with the simultaneous application of potential at the enabling terminal 44. The output terminal 77 of the high-low OR gate 78 will be at the logical "1" level in the event that the address signals are higher in numeric value than the desired position of the armature 21, and the terminal 79 at the inverter 91 will be at the logical "0" level. When the address signals are numerically lower, the levels are reversed for driving in the motor in opposite direction. The conditions at the output terminals 77 or 79 prescribe which set of the AND circuits 101–108 and the OR circuits 111–114 will be used to sequence the triggers 31, 32. These circuits of the motor switching circuit 30 are arranged in conventional logic arrangement for driving the motor armature 21 in a desired direction in accordance with the level of the signal at the drive signal terminals 77 and 79. As shown, the armature 21 will be driven in one, say the counterclockwise, direction when the drive signal terminal 77 is at the logical "1" level and in the other, or clockwise, direction when the drive signal terminal 79 is at the logical "1" level.

As shown in FIG. 3, the arrangement disclosed provides positioning to one of 32 positions with the motor 20 driven in the shortest direction to the desired address. By extending the logic as given in straightforward manner the system can be extended to 100 positions for a 200 position stepping device with the same efficiency. Beyond 100 positions the system might better be simplified to drive the motor always in a predetermined direction, although it should be recognized that the system shown can be extended to operate the motor in both directions, but not always over the shortest path. Travelling the shortest path for more than 100 positions will require an additional address register and an additional comparing circuit of the same type of logic as shown to determine whether the difference between the present address and the desired address is greater or less than 100. If the difference is greater, an inverter can be operated by the address comparing circuit to reverse the direction of the motor as determined by the comparing circuit shown in FIG. 3.

While the invention has been shown and described particularly with reference to a preferred embodiment thereof, and various alterations readily achieved by those skilled in the art have been suggested, it should be understood that those skilled in the art may effect still further changes without departing from the spirit and scope of the invention as defined hereinafter.

The invention claimed is:

1. An arrangement for positioning a movable member in one of a number of discrete positions, comprising:
   a stepping device having a stator and an armature coupled to said movable member for positioning the same in a number of discrete positions and having a plurality of field windings selectively energizable for holding said movable member fixed in position and for stepping said movable member through a predetermined series of said positions,
   circuitry including bistable electric circuits for cyclically energizing said windings selectively and simultaneously generating a binary signal indicative of the fine positioning of said movable member within said series of positions,
   a movable member position encoder providing a binary coded signal indicative of the coarse positioning of said movable member within one of a multiple of said series of positions,
   an address register arranged to store a binary coded addressing signal indicative of a desired position of said movable member,
   signal comparing means having a plurality of concatenated stages connected to said address register and having the higher order stages connected to said encoder and the lower order stages connected to said bistable electric circuits for comparing said addressing signal with the combination of said coarse position signal and said simultaneously generated fine position signal representing the instantaneous position of said movable member, and
   said signal comparing means being further connected to said bistable electric circuits for stepping said device to the position indicated by equality of said signals at which position said device is detented to hold said member fixed.

2. An arrangement for positioning a rotatable shaft in one of a number of discrete positions, comprising:
   a stepping motor having a stator and a rotor coupled to said shaft for positioning the same in said number of discrete positions and having a plurality of field windings selectively energizable for holding said rotor fixed in position and for stepping said rotor through a predetermined series of said positions,
   circuitry including a pair of bistable electric circuits for cyclically energizing said windings two at a time and simultaneously generating a binary signal indicative of the fine positioning of said shaft within said series of positions,
   a shaft position encoder providing a binary coded signal indicative of the coarse positioning of said shaft within one of a multiple of said series of positions
   an address register arranged to store a binary coded signal indicative of a desired position of said shaft,
   signal comparing means having a plurality of concatenated stages connected to said address register and having the third and higher order stages connected to said shaft encoder and the two lowermost orders connected to the outputs of said bistable electric circuits for comparing said address signal with the combination of said coarse position signal and said simultaneously generated fine position signal representing the instantaneous position of said shaft, and
   said signal comparing means being further connected to said bistable electric circuits for stepping said motor to the position indicated by equality of said signals at which position said motor is detented to hold said shaft fixed.

3. An arrangement for positioning a rotatable shaft in one of a number of discrete positions, comprising:
   a stepping motor having a stator and a rotor coupled to said shaft for positioning the same in said number of discrete positions and having a plurality of field windings selectively energizable two at a time to hold said rotor fixed in position with respect to said stator and for stepping said rotor through a series of four consecutive positions,
   two bistable electric circuits for cyclically energizing said windings and simultaneously generating a binary signal indicative of the fine positioning of said shaft within one of said series of four consecutive positions,
   a shaft position encoder providing a binary coded signal indicative of the coarse positioning of said shaft within one of a multiple of said series of four consecutive positions,
   an address register arranged to store a binary coded signal indicative of a desired position of said shaft,
   a signal comparator having a plurality of concatenated stages connected to said address register and having the third and higher order stages connected to said shaft encoder and the two lowermost orders connected to the outputs of said bistable electric circuits for comparing said address signal with the combination of said coarse and simultaneously generated fine position signals representing the instantaneous position of said shaft, and
   said signal comparator being further connected to said bistable electric circuits for stepping said motor to the position indicated by equality of said signals at which position sad motor is detented to hold said shaft fixed.

4. An arrangement for positioning a rotatable shaft in one of a number of discrete positions, comprising:

a stepping motor having a stator and a rotor coupled to said shaft for positioning the same in said number of discrete positions and having four field winding selectively energizable two at a time to hold said rotor fixed in position with respect to said stator and for stepping said rotor through a series of four consecutive positions, two bistable electric circuits having input terminals and output terminals coupled to said windings for cyclically energizing said windings two at a time and simultaneously generating a binary signal at the output terminals indicative of the fine positioning of said shaft within one of said series of four consecutive positions, a shaft position encoder providing a binary coded signal indicative of the coarse positioning of said shaft within one of a multiple of said series of four consecutive positions, an address register arranged to store a binary coded signal indicative of a desired position of said shaft, a signal comparator having a plurality of concatenated stages connected to said address register and having the third and higher order stages connected to said shaft encoder and the two lowermost orders connected to the outputs of and the output terminals of said bistable electric circuits for comparing said address signal with the combination of said coarse and simultaneously generated fine position signals representing the instantaneous position of said shaft, a pulse voltage generator, a gating circuit coupling said pulse generator to the input terminals of said bistable electric circuits, and said signal comparator being further connected to said gating circuit for stepping said motor to the position indicated by equality of said signals at which position said gating circuit is opened and said motor is detented to hold said shaft fixed.

5. An arrangement for positioning a rotatable shaft as defined in claim 4 and wherein each stage of said comparator comprises a pair of AND gating circuits having the output lines thereof ORed into the next lower order stage save the last stage, the last stage is ORed into an INVerter stage, and the INVerter stage is connected to said pulse generator gating circuit.

6. An arrangement for positioning a rotatable shaft as defined in claim 5 and wherein each stage of said comparator comprises an additional AND gating circuit connected to said address register and to the inverse instantaneous position signal source, an OR gating circuit into which all said additional AND gating circuit output lines are connected and having an output line coupled to the input terminals of said bistable electric circuits both directly and through an additional INVerter circuit.

7. An arrangement for positioning a rotatable shaft as defined in claim 6 and incorporating eight dual AND gating circuits ORed in pairs to said pulse generator gating circuit, each of said pairs of dual AND gating circuits having one input terminal connected directly to said OR gating circuit and one input terminal connected to said additional INVerter circuit, the other terminals of each of said pairs of dual AND gating circuits being connected to the output terminals of said bistable electric circuits with the output terminals of said bistable electric circuits being connected to the dual AND gating circuits having the outputs thereof applied to the input terminals of the other of said bistable electric circuits.

8. An arrangement for positioning a rotatable shaft as defined in claim 6 and wherein said bistable electric circuits are cross-coupled by dual AND gating circuits having the output lines connected to the input terminals of the bistable electric circuits in pairs through said pulse generator gating circuit, and the other input terminals of the pairs of dual AND gating circuits directly and through said INVerter circuit.

References Cited

UNITED STATES PATENTS 3,004,251  10/1961  Rapacz.
3,098,187  7/1963  Sciaky.

ORIS L. RADER, *Primary Examiner.*

T. LYNCH, *Examiner.*